United States Patent [19]

Novak et al.

[11] Patent Number: 4,668,743

[45] Date of Patent: May 26, 1987

[54] FLUORINE INDUCED DEHYDROHALOGENATION PROCESS

[75] Inventors: Leo R. Novak, Lake Jackson; David C. Kelley, Angleton; Philip Y. Lau, Houston, all of Tex.

[73] Assignee: The Dow Chemical Company, Midland, Mich.

[21] Appl. No.: 757,558

[22] Filed: Jul. 22, 1985

[51] Int. Cl.[4] .............................................. C08F 8/26
[52] U.S. Cl. .................................. 525/356; 525/366; 525/369; 525/382; 525/334.1
[58] Field of Search ..................... 525/334.1, 356, 366, 525/369, 382

[56] References Cited

U.S. PATENT DOCUMENTS 4,567,241 1/1986 Kitchens et al. .................... 525/352
4,595,706 6/1986 Milligan et al. ........................ 521/53

*Primary Examiner*—Joseph L. Schofer
*Assistant Examiner*—Bernard Lipman

[57] ABSTRACT

A process and the product made thereby are disclosed in the preferred form of this process, chlorinated polyethylene is first fluorinated ambient temperature for an interval of contact with elemental fluorine. Then, contact with a strong base converts the polymer into conjugated double bonds, reducing electrical resistance. The double bonds yield a surface layer able to controllably conduct electrical current.

10 Claims, No Drawings

FLUORINE INDUCED DEHYDROHALOGENATION PROCESS

BACKGROUND OF THE DISCLOSURE

This disclosure is directed to a process to convert polymers into completed products which are electrically conductive across the surface. More particularly, the present procedure accomplishes conversion of polymeric surfaces into a conductive surface at milder conditions and in shorter treatment times during the practice of the improved process of this disclosure. Perhaps a definition of various electrical conductivities will assist in identifying benefits of the present process. In general terms, a material which has an electrical conductivity of $10^{-15}$/ohm cm is defined as an insulator. Any material which is less conductive of this can be treated as an insulator material. Where the conductivity is typically in the range of about $10^{-6}$ to about $10^{-9}$, an antistatic material is provided. An EMI shielding polymer typically will have a conductivity of about the range of $10^{-2}$ to about $10^{-6}$. A conductivity of about 1 is typical of silicon and the conductivity of graphite is about $10^6$. Conductive metals such as silver and copper typically have a conductivity of about $10^9$. The present procedure enables manufacture of polymer materials which, subject to control of the process, can yield antistatic materials or EMI shielding materials.

Utilizing a feed stock which includes a typical polymer (polyethylene), changes in the chemical structure can be made through the various steps of this disclosure for obtaining a conjugated double bond system in the polymer chain.

The method of treatment disclosed has great advantage in intermediate step fluorination which prepares the polyethylene polymer or co-polymer system for subsequent treatment. By contrast with the present disclosure, it is possible to expose chlorinated polyethylene (CPE) with a strong base such as ethylenediamine (EDA) for many hours at ambient temperature with little or no reaction. This can be forced to yield a polymer which is altered in conductivity and which can therefore be described as a non-conductive material. By contrast, the present disclosure describes a dehydrohalogenation step which proceeds in quick order at ambient conditions. This disclosure sets forth a fluorine treatment which can then be dehydrohalogenated at room temperature in short order, perhaps a few minutes. Absent the fluorine treatment, the only way to force the conversion through dehydrohalogenation is to utilize excessive temperature of perhaps 100° C. or higher and much longer contact intervals with the EDA to accomplish dehydrohalogenation.

It is one object of the present procedure to therefore provide a preliminary step to assist in conducting the dehydrohalogenation step in the presence of a strong base (EDA is typical) and to obtain controllable surface penetration and controllable conversion to selected ranges of electrical conductivity.

Other advantages of the present procedure will become more readily apparent upon an evaluation of the process described hereinbelow. Moreover, a product is manufactured as will be described. Various examples of the method of manufacture are also set forth. In like fashion, specific tests describing the electrical conductivity are also included.

DETAILED DESCRIPTION OF THE PREFERRED EMBODIMENT

The method of the present disclosure relates to the conversion of chlorinated polyethylene (CPE) in one embodiment. Polyethylene with a measure of chlorination typically will have a chlorine atom on the chain perhaps 1:5 to about 1:15 carbon atoms in the chain. The present procedure works well with CPE either as a single polymer or in a co-polymer system with other polymers which may (or may not) be susceptable to the present treatment. To the degree that the polymer system involves other polymers not converted, the extent of change in conductivity may be altered depending on the nature and percentage of the other polymers making up the polymer system. In any case, assume that the CPE typically has a chlorine atom at spaced locations along the chain typically in the range of 1:5 to 1:15 chlorine to carbon atoms.

FIRST EXAMPLE

CPE powder of a size smaller then 20 mesh in a closed container was reacted with about 10% elemental fluorine mixed with an inert gas. Nitrogen is a suitable inert gas. A suitable closed container having a nickel or copper surface will suffice. A CPE resin was sieved through a number 40 sieve before placing it in the closed reactor. The reactor was agitated continuously to stir the powder in the reactor. Preferably, the reactor is cooled because the reaction is exothermic and the cooling limits the maximum temperature achieved in the reactor. After suitable initial purging of the reactor, the gas flow including fluorine and nitrogen (in a ratio of about 10% to about 90%) was introduced into the reactor. While the CPE in the reactor was exposed to fluorine, agitation continued to assure exposure of all the particles on all surfaces. Fluorination was continued for about 6 hours. Thereafter, the chamber of the reactor was exhausted and the powder in the chamber was then retrieved. The treated powder was then dried at about 60° C. in a vacuum oven for a few hours (typically four hours) to remove hydrogen fluoride. The power then obtained was pressed into a film in a press. The press plates were heated to about 280° F. while 15 tons pressure applied. The pressure applied was approximately 300 to 3000 pounds per sq. inch. The pressure was sustained in the range of 5 to 50 minutes. The pressed material formed a film. This film was then contacted with EDA at ambient pressure and temperature for about 30 minutes. The EDA was substantially pure. Substantially on contact, the CPE film in the presence of EDA provided a color indication indicative of immediate reaction.

After about 30 minutes, the film made of pressed CPE was then retreived, washed with methanol and dried. It was next tested using the procedure set forth at ASTMF-43-78 utilizing a 4 point probe. The resistance measured was about $10^5$ ohm cm.

SECOND EXAMPLE

Polyethylene film of about 1 mil thickness was reacted with approximately 95% chlorine and the remainder fluorine for period of about 4 hours in the reactor. This converted polyethylene film into CPE. Thereafter, it was reacted with about 10% fluorine and an inert gas. Again, the preferred inert gas is nitrogen. This second reaction extended for about 4 hours. Afterwards, the sample was placed in a vacuum oven maintained at about 60° C. and heated for about 4 hours to remove any hydrogen fluoride. The treated sample was then reacted with EDA for about 5 minutes and then washed with distilled water. The next step involves washing with acetone for about 5 minutes and vacuum drying. Utilizing the same testing procedure and test equipment as described in Example 1, the resistance was again measured and was about $10^5$ ohm cm.

Procedural Steps

Prior to treatment in a closed chamber, it is necessary to remove oxygen from the chamber. Typically, a chamber is evacuated with an inert gas for 2 or 3 cycles at which time the chamber may be deemed free of oxygen. A typical flow rate of 10% fluorine and 90% nitrogen is perhaps 20 cc per minute for a chamber of less than 1000 ml volume. This flow rate is continued for something between 4 and 6 hours reaction time whereupon the fluorine flow is discontinued and the chamber is then purged with nitrogen or some other inert gas. After traces of fluorine are removed from the chamber, the reaction chamber can then be opened to enable removal of the treated polymer. The procedure involving cleaning in the vacuum oven typically extends for about 1 to about 6 hours.

DESCRIPTION OF THE CONVERSION

Initially the CPE has a polymer chain of the general form:

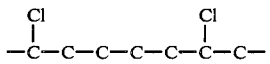

After exposure to fluorine in the reaction chamber, the CPE is then converted into the following general form:

Thereafter, reaction with a strong base at room temperature for a short interval provides the controllably electrically conductive polymer featuring conjugated double bonds thus exemplified by:

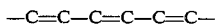

The depth of the reaction wherein the conjugated double bonds are formed is (in part) evidenced by change in color. Typically, this last step is accomplished with approximately 99% pure EDA for times up to about 30 minutes at ambient temperature. However, the color change is quick to show a reaction by coloration and hence it is believed that the conjugated double bonds are formed rapidly, at least at the surface chains. Through the use of ESCA (Electron Spectroscopic Chemical Analysis), one analysis showed an increase in concentration of fluoride from about 0% to about 20% fluoride. Likewise, chlorine concentration typically decreased from about 34% to 24% compared with unfluorinated CPE. It is proposed that fluorination achieves substitution of fluorine for some hydrogen and chlorine on the chain. The treatment step preferably begins with fluorine and may progress to mixtures with fluorine; the process is thus said to be fluorine initiated. More will be noted concerning this hereinafter.

Effective dehydrohalogenation is not only accomplished with EDA but it is also accomplished with NaOH and/or with $NaOH_3$. ESCA analysis of electrically conductive CPE after dehydrohalogenation with EDA shows a small percentage of (up to about 3%) nitrogen bonded in the polymer. It would appear that dehydrohalogenation with EDA yields about one order of magnitude more conductive material then that obtained with alternate strong bases. To further change the electrical conductivity, temperature control during the dehydrohalogenation step would appear to incease the amount of chlorine removed without seriously impacting the fluoride in the polymer. Thus, one of the process control factors is the temperature of the base and the duration of the exposure to of the base. It would appear from ESCA analysis that the dehydrohalogenation step removes a controllable percentage of the fluorine present in the fluorinated CPE dependent on intervals and temperature. As will be understood, increase in the duration and temperature of the process step yields a range of control over the conductivity of the treated CPE.

Utilizing suitable and known laboratory analytical techniques, when a film is treated, there is a measureable surface conductive layer. In one procedure, a layer of about 40-50 microns thick was formed, having a dark brown color and displaying a highly oriented structure. Underneath, there was a second layer which was oriented structurally, typically yellow in color and perhaps 1.5 mm thick. Material beyond this layer would comprise a third layer which is primarily unoriented and beige in color. Through the use of suitable spectroscopy particularly testing for fluorine and chlorine, the fluorine seemed to be evident in only the first 40 or 50 microns thickness, that is, the layer which shows brown coloration. However, chlorine is found to be relative uniform through all layers of the sample. Thus, from the spectroscopic analysis, it is thought that both the physical orientation and the presence of conjugated double bonds in the chains contribute to controllable electroconductivity characteristics in the surface layer. This enables adjustment of the electroconductivity parameter over the range exemplified above ($10^{-9}$ to about $10^{-2}$) a range of about 7 orders of magnitude. Thus, the conductivity can be controlled depending on operative exposure times, strength of the base solution, temperature of the base solution, all factors regarding exposure of the fluorinated CPE film at the intermediate step. It is conjectured that the fluorine penetration into solid polymer material is thus controlled in the range of about 40-50 microns to accomplish surface conversion of electrical conductivity characteristics.

Lewis acid treatment ($I_2$, $BF_3$ or $H_2SO_4$ are typical) can be used instead of fluorine in a contact process.

While the foregoing is directed to the preferred embodiement includes a representative procedures in the practice of the present disclosure, and describes the product obtained thereby, the scope is determined by the claims which follow.

What is claimed is:

1. A method of imparting conductivity to nonconducting chlorinated polyethylene polymer having a form exposing a surface thereof for treatment, the method comprising the step of at least partially halogenating the polymer in an inert atmosphere having a specified amount of fluorine gas, and the subsequent step of dehydrohalogenating the polymer by contact with a base sufficient to form conjugated double bonds to thereby control surface electrical conductivity.

2. The method of claim 1 wherein the fluorine gas is diluted by an inert gas.

3. The method of claim 1 wherein the dehydrohalogenating step occurs by contacting the polymer surface with a basic solution of ethylenediamine, sodium hydroxide, or sodium methoxide.

4. The method of claim 1 wherein the polymer is further treated by contact with a Lewis acid.

5. The method of claim 1 including the step of fabricating the polymer to a desired final shape before the dehydrohalogenating step.

6. The method of claim 1 including the step of placing the polymer in a closed reactor, initially purging the reactor to remove any oxygen therein, and thereafter conducting a flow of fluorine gas mixed with an inert gas into the reactor at ambient temperature.

7. The method of claim 6 including the subsequent step of contacting the treated polymer with a base solution of sufficient strength and for an interval to obtain surface conversion of color in the polymer to form a brown layer thereon.

8. The method of claim 7 wherein the polymer at or below the surface is converted to provide conjugated double bonds in the polymeric chain yielding a surface layer having conductivity of $10^{-9}$/ohm cm or greater.

9. The method of claim 8 wherein the conductivity of the completed product is between about $10^{-9}$ to about $10^{-2}$/ohm cm.

10. The method of claim 6 wherein conductivity is through a surface layer or brown coloration of at least about 40 microns thick and having an oriented structure.

* * * * *

UNITED STATES PATENT AND TRADEMARK OFFICE
CERTIFICATE OF CORRECTION

PATENT NO. : 4,668,743

DATED : May 26, 1987

INVENTOR(S) : Leo R. Novak, et al.

It is certified that error appears in the above-identified patent and that said Letters Patent is hereby corrected as shown below:

The term of this patent subsequent to June 17, 2003, has been disclaimed.

Signed and Sealed this

Twenty-second Day of November, 1988

Attest:

DONALD J. QUIGG

*Attesting Officer*  *Commissioner of Patents and Trademarks*